E. T. FORD.
Harvester Rake.
No. 52,700. Patented Feb. 20, 1866.
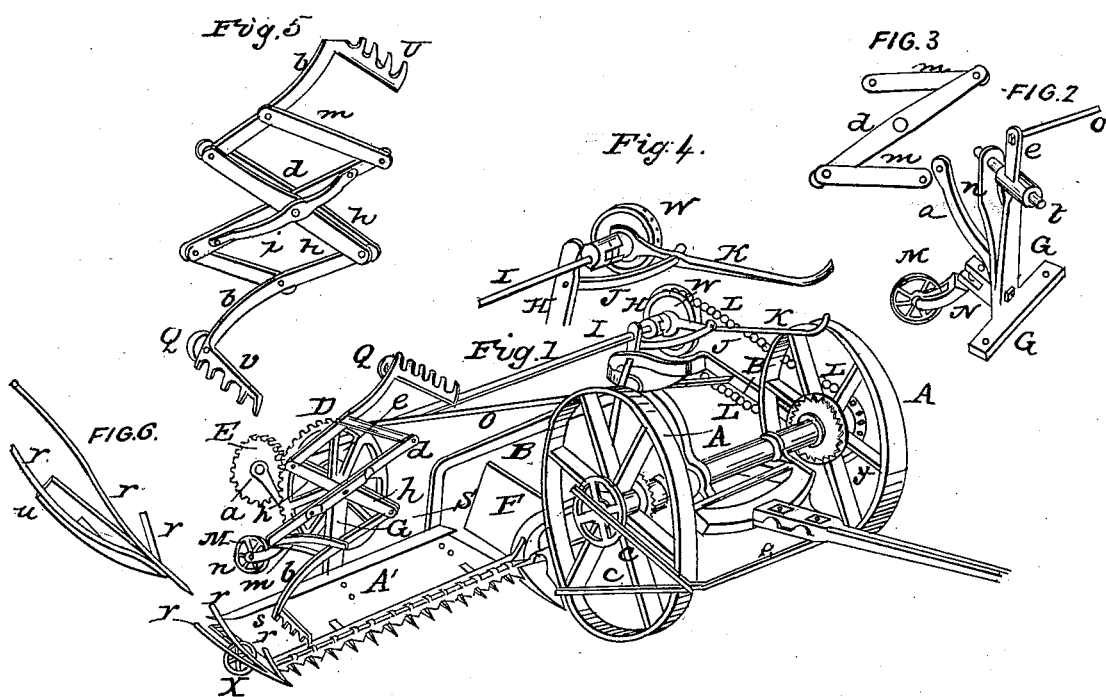
WITNESSES
E. G. Wing
Joshua Anthony
INVENTOR
E. T. Ford

UNITED STATES PATENT OFFICE.

ELIAS T. FORD, OF STILLWATER, NEW YORK.

IMPROVEMENT IN HARVESTER-RAKES.

Specification forming part of Letters Patent No. 52,700, dated February 20, 1866.

*To all whom it may concern:*

Be it known that I, ELIAS T. FORD, of Stillwater, county of Saratoga, State of New York, have invented new and useful Improvements in a Rake Attachment to Reaping-Machines; and I do hereby declare that the following is a clear and exact description of the construction and operation of the same, reference being had to the accompanying drawings, making a part of this specification, in which—

Figure 1 is a side perspective view of the rake with other parts of a harvesting-machine. Figs. 2, 3, 4, 5, 6 are detached sections of the rake. The detached sections illustrate certain parts more perfectly.

Like letters refer to like parts in all the drawings.

The nature of my invention consists, principally, in the arrangement and construction of a certain number of bars located upon a center shaft and arranging the bars with gear, and in a manner as to effect a contraction and expansion of the rake-heads and moving the cut grain horizontally off the platform, all of which are more fully hereinafter described and set forth.

Having thus described the nature of my invention and improvements, I will here proceed to describe the construction and operation of the same, which is as follows, to wit:

Fig. 2 represents a section, which I term a "standard," with the branch sections $c$, $n$, and $a$. The caster-wheel M, with the sections N and P, are secured to standard G near the base. The upper extremity of standard G is formed tubular and with the extension $e$ receiving the rod $o$. The center shaft, $t$, is located within the tubular standard and extending to and passing through the rear section, $n$.

Fig. 3 illustrates the longer bar $d$ with a center orifice, and pivoted to the bars $m$ $m$ through the orifices made at their extremities. I now arrange and connect the bars $d$ $m$ $m$ $h$ $h$ and side brace, $i$ $i$, with bolts or pivots, as seen in Fig. 5, and rake-heads $v$ $v$, attached to arms or bars $b$ $b$, all of which have center orifices made for the reception of the center shaft, $t$. The distances of the bars $h$ $h$, $m$ $m$, and $b$ $b$ from the center orifices to the bolts or pivots are equal, excepting the center bar, $d$, which is a little longer in order to give an easy movement to the rake-heads $v$ $v$ and arms or bars $b$ $b$, as they conform horizontally to the platform A'. I now take the bar, $d$, as seen in Fig. 3, with short bars $m$ $m$, and connect them to the bars $b$ $b$ $h$ $h$ and side brace, $i$ $i$, as seen in Fig. 5, and the whole arrangement, as seen in Fig. 5, is located upon the front portion of the center shaft, $t$.

The standard G, with "rake," as I shall term it, is situated in rear and connected to the platform A', as seen in Fig. 1. The guide-flange S S is secured to the standard G and semi-frame B, and so constructed at the right portion of the same as to receive the friction-rollers Q Q, which are placed at the rear and lower side each of rake-heads $v$ $v$, as also seen in Fig. 5, and so adjusted as to allow the friction-rollers to move horizontally between the guide S S and platform A'. The larger bevel-gear D is placed upon the center shaft, $t$, as seen in Fig. 2, occupying a position between the sleeve of standard G and rear section, $n$.

The smaller gear E, with drive-shaft I of rake, is arranged with the larger bevel-gear D, and has its bearing with shaft I upon the rear and right section, $a$, as seen in Fig. 1. The drive-shaft I of rake extends to the left, and is supported by the bearing upon section H, which is erected upon the left portion of semi-frame B, as may be seen in sectional parts in Fig. 4, with lever-fulcrum J, lever K, clutch P, and pulley W.

The rake-bar B is so bent or formed (seen in Fig. 1) as to be secured to the left and rear corner of platform A', extending to the left and and upon a line with the left side of drive-wheel A, here it being bent at right angle, projecting forward to and embracing the main axle of drive-wheels A A.

Upon the left side of pulley Y, and at the right of the left angle of bar B, I erect the section H with fulcrum-section J, lever K, which supports also the left portion of drive-shaft I, as seen in Figs. 2 and 1. The brace-rod $o$, a section of which is seen in Fig. 2, extends to the left, and is secured to the bar B in front of the left angle.

Upon the left portion of the drive-shaft I, I locate the pulley W, the hub of which is formed with a clutch. The clutch P also is situated at the right of the pulley W, adjacent thereto, and rigid to the shaft I. The pulley W acts as a loose pulley turning upon the shaft I. Upon the hub of left pulley W there is a circular groove cut for the reception of the rear portion of hand-lever K, and the lever K is so formed at the rear as to embrace the groove of pulley W.

The hand-lever K has its fulcrum upon section J of section H, as seen in Figs. 2 and 1.

The open-link chain L embraces the two pulleys W and Y, as seen in Fig. 1.

The relief-board F is attached to the machine aside from the platform A'.

The caster-wheel M is placed in rear and affixed to the standard G supporting the rake and platform A'.

Operation: As the machine is moved forward, turning the left pulley Y upon the main axle and open-link chain L, thereby communicating the motion to and turning the rear pulley, W, with shaft I, smaller pinion E, gear D, center shaft, t, rake with heads v v, thereby causing the rake composed of bars d h h m m b b to revolve from left to right, and as the rake-heads v v each come in contact with or between the guide S and platform A' contract and expand in a manner as to conform horizontally to the platform A', gathering and removing the cut grain from right to left and depositing it in gavels adjacent to the relief board or plate F. At this point a sufficient space is provided to receive the gavel and allow it to fall upon the ground at intervals, and be out of the way of the machine in cutting the next swath. The friction-rollers Q Q simply facilitate the movement of the rake-heads v v; but the center bar, d, being longer than the connecting-bars m m from the points of their pivots, it causes the rake to contract and gather up the gavel in its movement with more ease and less friction, and soon as the friction-rollers Q Q are moved out of the guide S the arms b b are permitted to expand, and in their motion describe an irregular ellipse. At the same time the rake-heads v v are in rear and out of the way of the cut and falling grain, also embracing all the cut grain by the rake-heads v v.

The quantity of grain or size of gavel may be regulated at the discretion of the operator by moving the hand-lever K to the right, thereby disconnecting the pulley W from the clutch P of drive-shaft I, consequently stopping the rake until a sufficient quantity, greater or less, accumulates upon the platform A'; but in ordinary growth of grain the motion of the harvester may be regulated by the gear of the same. The raker is set in motion by the operator, sitting upon the driver's seat, moving the hand-lever K to the left, causing the clutch of pulley W to come in contact with clutch P, moving the rake, as before explained. A reel may be used with this rake similar to other harvesters; and

What I claim, and desire to secure by Letters Patent, is—

The combination as described, forming a contracting and expanding harvesting-rake, the said combination consisting of the pivoted centers d d, links m m, rake-arms b b, and rakes v, arranged on shaft t and operated by bevel-pinion E on shaft I and bevel-gear D, in the manner as set forth, and for the purpose specified.

ELIAS T. FORD.

Witnesses:
  E. G. D. KING,
  JOSHUA ANTHONY.